Patented Feb. 21, 1939

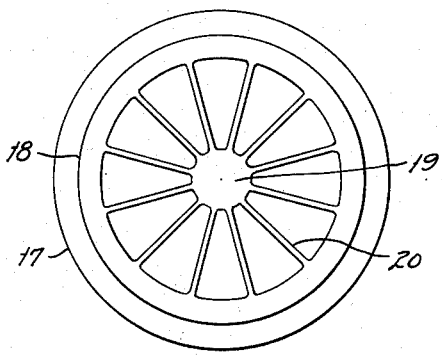
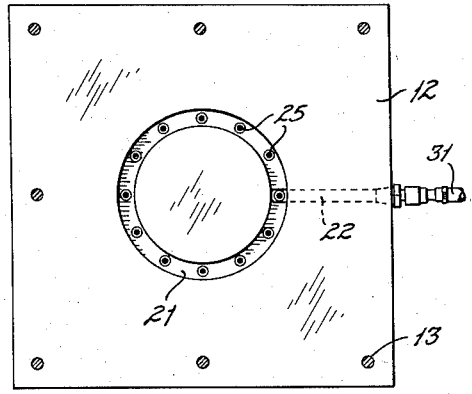
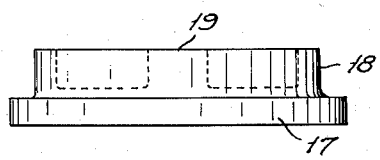
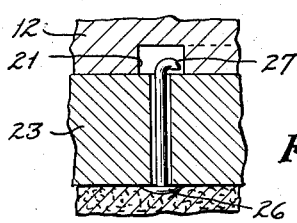
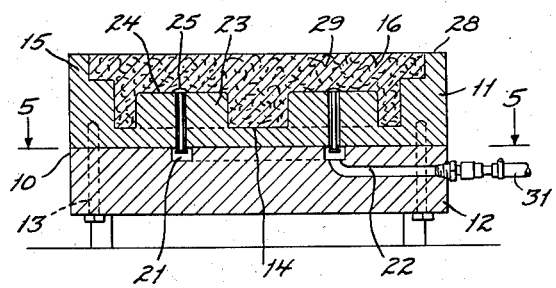
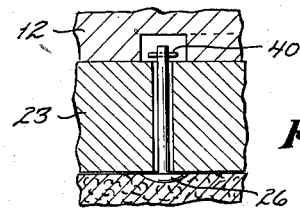
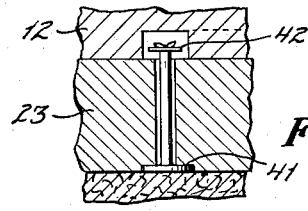
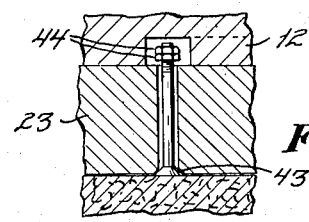
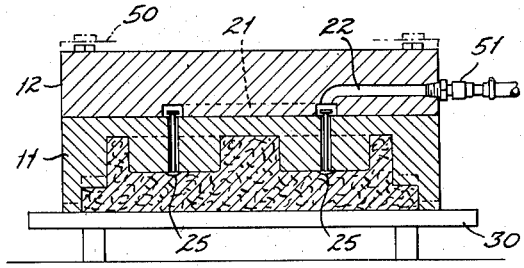

2,148,084

UNITED STATES PATENT OFFICE 2,148,084

MOLDING APPARATUS

Leo F. Nock, Elyria, Ohio

Application June 12, 1937, Serial No. 147,948

5 Claims. (Cl. 25—120)

This invention relates to the molding of articles by so-called permanent molds, and more particularly to the removal of the molded article from the mold.

In the various arts, articles are frequently molded or cast in permanent molds from material which tends to adhere to the mold after the material solidifies. Regardless of the form of the molded articles, wastage frequently results by breaking or mutilating the solidified articles upon removing them from the mold. This is particularly true of articles formed with a relatively thin section such as a rib or the like. Among such materials are the "setting plasters" such for example as plaster of Paris sometimes used with fibrous materials such as asbestos fibers incorporated therein although the same difficulty is encountered with various other materials.

I have found that a gas such as compressed air may be introduced into the mold to aid in effecting separation of the mold and the solidified cast article but that the gas must be controlled in a manner to prevent injury to parts of the casting.

It is therefore a primary object of my invention to provide an improved apparatus permitting removal of a molded article from a mold without damage to such article.

Another object of my invention is to provide a mold of the so-called permanent mold type provided with means whereby an article molded therein may be removed therefrom in an improved manner.

Another object of my invention is to provide an improved means for molding articles in a permanent mold from plastic or liquid solidifying material which tends to adhere to the mold surfaces when it solidifies and for removing the solidified article from the mold in an improved manner to avoid mutilation or breaking thereof.

Another object of my invention is to provide a mold of the so-called permanent mold type provided with means whereby an article molded therein may be removed therefrom by fluid pressure controlled to prevent injury to the molded article.

Another object of my invention is to provide improved means for removing a molded article from a mold through the use of fluid pressure and valve means preventing concentration of fluid pressure on a particular part of the molded article with probably resultant injury thereto.

Other objects of my invention and the invention itself will become increasingly apparent from a consideration of the following description and drawing wherein:

Fig. 1 is a plan view of a molded article which may be made by the practice of my invention;

Fig. 2 is a side elevational view of the article of Fig. 1;

Fig. 3 is a transverse sectional view illustrating a mold embodying my invention and illustrating a step in the process of making the article of Figs. 1 and 2;

Fig. 4 is a view of the parts of Fig. 3 in an inverted position illustrating another step in the process of making the article;

Fig. 5 is a view taken along the plane 5—5 of Fig. 3;

Fig. 6 is a preferred form of valve means which I may employ in the mold in Figs. 3 and 4, and Figs. 7, 8 and 9 are modified forms of valve means which I may employ in the molds of Figs. 3 and 4.

Referring now to the drawing, I have shown generally at 10, a so-called permanent mold comprising an upper part 11 and a lower part 12 detachably secured together by bolts 13 projected through the part 12 and threadingly engaging the part 11 or similar suitable means securing the parts 11 and 12 together. The upper part 11 comprises a bottom wall 14 and a continuous side wall 15 within which is formed a mold cavity 16 upwardly open. The mold 10 is preferably made from rigid durable material such as metal so that it may be used in molding a great number of the same articles successively. In the embodiment illustrated, the cavity 16 is of the same shape as the article of Figs. 1 and 2 to be molded therein.

As best illustrated in Figs. 1 and 2, this article comprises an annular base 17, an annular ring 18 superposed on the base, a central hub 19, and a plurality of relatively thin web-like spokes 20 connecting the ring and the hub.

The lower part 12 of the mold 10 is provided with an annular groove 21, preferably square form in cross section, and having a duct 22 communicating therewith. The upper mold part 11 is provided with a plurality of generally triangular segments 23 upstanding from and integral with the bottom wall 14. The upstanding segments 23 of the mold are interposed between the web-like spokes 20 of the molded article. Preferably each of the segments 23 have a channel 24 therethrough within which is slideably disposed a valve element 25.

The valve element 25 comprises valve head 26 engageable with the face of segment 23 of mold part 11 and a hook portion 27 projected within the annular recess 21 of the lower mold part 12 and adapted to abut the lower face of the upper mold part 11 to limit movement of the valve element. It will be noted by reference to Fig. 6 that the valve element 25 has a stem portion thereof loosely disposed within the channel 24 provided therefor in segment 23 to permit free movement in a vertical direction of the valve element.

The mold 10 is disposed with the cavity upwardly open and the material from which the article is to be cast is poured thereinto so it rises to the level of the upper annular edge 28 of the mold. After the mold material has solidified, the mold 10 together with the cast material 29 therein is turned upside down and is supported by a plate 30, as best illustrated in Fig. 4.

The duct 22 communicates outwardly with a pipe 31 connected to a source of fluid pressure (not shown) such as air or a similar gas under pressure, the compressed fluid being under the control of a manually operable valve (not shown).

The compressed fluid moves the valve element 25 including the valve head 26 downwardly, as illustrated in Fig. 4, permitting the fluid to be directed laterally intermediate the cast article and the mold. The movement of the valve element 25 permitting fluid pressure to be communicated to the cast article is relatively slight and I have found that a movement of 1/64" is sufficient for effecting release of the cast article from the mold. The force of the fluid tending to move the valve element is aided by the weight of the element with the mold in the position of Fig. 4. It will be noted that the valve head 26 deflects the fluid pressure laterally over a relatively wide area and prevents the fluid under pressure from being concentrated on a relatively small area of the molded article and thereby eliminates any tendency to injure the article.

In Fig. 7, I have shown a modified form of valve element wherein the means limiting valve movement comprises a pin 40 projected through the valve element stem instead of the hook portion 27 of the embodiment of Fig. 6.

Fig. 8 illustrates a further modified type of valve element wherein the face of each segment 23 is counterbored to accommodate a disc type valve head 41 and a washer 42 is telescoped over the valve element stem and the stem end is peened over to retain the washer.

Fig. 9 illustrates a further modified type of valve element generally similar to that illustrated in Fig. 8 but wherein the face of segment 23 is provided with a countersunk valve seat adapted to receive a frusto-conical valve head 43 provided on the valve element, the valve stem being threaded at its opposite end to receive lock nuts 44. In this modification, the opening movement of the valve element may be adjusted by manipulation of the lock nuts upon detaching mold parts 11 and 12. It will be noted that the modifications of both Figs. 8 and 9 provide a valve head normally flush with the face of segments 23 and since the valve element travel is approximately 1/64", there is little tendency to form a slight depression in the molded article at the zone of contact with the valve head.

While my invention may be practiced with various molding materials, liquid or plastic, it has particular advantages when practiced with the hard setting plasters, such as plaster of Paris, or plaster of this class having mixed therein fibrous material such as asbestos fibers. Articles molded from this class of material are extensively used as cores in subsequent molding of articles from metal and such molding materials have a very pronounced tendency to stick to the walls of the mold cavity in which they are poured and allowed to set. The operation of my invention as above described will now be considered in connection with material of this class.

The mold and the material formed therein may be turned over to the position of Fig. 4 as soon as the material is set. The material in this condition will still contain a quantity of free moisture and will therefore be damp at the surfaces thereof contiguous to the molding surfaces in the mold cavity. While the material of the molded article is still in this condition, the manual control valve is opened to admit gas, preferably air, from the pressure source through the pipe 31 into the duct 22, and the pressure of the air is transmitted through the channels 24 to the molded article. This air pressure will be diffused, as previously explained, through contact with the valve element head and distributed intermediate the mold and molded article. I have found that, particularly with materials of the plaster class referred to, air thus applied under pressure at the channels 24 will penetrate along the contiguous surfaces of the mold cavity and mold material 29 under the control of the valve head until a film of air exists substantially over the entire surface of the mold and separates or detaches the molded moist material from the surface of the mold cavity.

I have further found that after the molded material is thus detached from the surface of the mold cavity, and with the parts in the position of Fig. 4, the entire mold 10 may be slightly raised or elevated from the molded material and into the position indicated by the broken line 50 in Fig. 4; the amount of elevation indicated by this broken line being exaggerated for clearness. The mold now being entirely free from the molded article may manually be lifted to leave the molded article on the plate 30 whence it may be removed and further dried or otherwise treated to render it suitable for use.

I have also found that the air or other gas under pressure will act as above described, most efficiently if the molded material be one which, after having solidified, remains moist, and I have also found that a suitable pressure for the gas is 65 lbs. to 85 lbs. per sq. in. Regardless of the exact shape of the article to be molded, I prefer that the channels 24 shall be disposed adjacent to the part most liable to adhere to the mold and be fractured so that the air pressure when relieving the molded article from the mold cavity will move these more delicate parts out of the mold along with the more massive portions thereof.

The channels 24 are closed at their upper ends by the valve elements with the mold cavity disposed upwardly as in Fig. 3 so that flow of the molding material into the channels is prevented.

Although I preferably use air or a similar gas, oil, water or other liquids or fluids may be employed.

If desired, the molded article may be elevated out of the mold in the position illustrated in Fig. 3, leaving the mold itself upon its support rather than raising the mold from the molded article.

Any number of channels 24 may be provided and regardless of whether the molded article is lifted from the mold by the gas pressure, or whether the mold is lifted from the article, I preferably dispose the channels 24 so that the resultant lifting force will pass substantially through the center of gravity of the element being elevated so as to raise all parts uniformly.

To facilitate turning the apparatus upside down, as described, a rotary coupling as indicated at 51 may be employed, or the pipe 31 may be flexible hose of substantial length.

Although I have shown and described a preferred embodiment of my invention, I contemplate that numerous and extensive departures may be made therefrom without departing from the spirit of my invention and the scope of the appended claims.

Having thus described my invention, what I claim is:

1. A permanent mold for plastic or liquid solidifying material comprising a body of rigid material having an upwardly open mold cavity formed therein, a fluid duct extending inwardly through the body beneath the mold cavity, a plurality of upwardly extending channels communicating with the duct and opening into the cavity, said channels being substantially equally spaced from the center of the cavity, a valve element slideably mounted in each of said channels including a stem and enlarged head engageable by gravity with peripheral portions of the cavity opening, the valve elements being adapted to prevent entrance of moldable material into the channels, means for transmitting fluid under pressure through the duct and channels, and the valve elements being movably responsive to fluid pressure to direct fluid into the cavity and laterally of the valve element axes through fluid contact with the heads of the valve elements.

2. A permanent mold for plastic or liquid solidifying material comprising a body of rigid material having an upwardly open mold cavity formed therein, the mold body comprising two parts detachably secured together, a fluid duct extending inwardly through the body beneath the mold cavity at the zone of juncture of the mold parts, a plurality of upwardly extending channels communicating with the duct and opening into the cavity, said channels being substantially equally spaced from the center of the cavity, a valve element slideably mounted in each of said channels including a stem and an enlarged head engageable by gravity with peripheral portions of the cavity opening, the valve stem having a lateral abutment extending into the duct and spaced from and engageable with the mold body to limit valve opening movement, means for transmitting fluid under pressure through the duct and channels, and the valve elements being movable responsive to fluid pressure to direct fluid along the base of the cavity.

3. A permanent mold for plastic or liquid solidifying material comprising a body of rigid material, the body comprising an upper part having an upwardly open mold cavity therein, a lower part detchably secured to the upper part and having a continuous fluid duct formed in the top surface thereof, upwardly extending channels in the upper part effecting communication between the fluid duct and the mold cavity, said channels being substantially equally spaced from the center of the cavity, a valve element slideably mounted in each of said channels including an enlarged head engageable with portions of the cavity by gravity to close its associated channel against the ingress of moldable material, each valve element including a stem projected through the channel having a lateral abutment at its lower end slightly spaced from the base of the upper mold part with the valve element in closed position and engageable with said base to limit valve opening movement, means for transmitting fluid under pressure through the ducts and channels, and the valve elements being movable to open position in response to fluid pressure against the valve heads to direct fluid into the cavity.

4. A permanent mold for plastic or liquid solidifying material comprising a body of rigid material having an upwardly open mold cavity formed therein, the mold body comprising two parts detachably secured together, a continuous fluid passage being provided beneath the mold cavity and at the zone of juncture of the mold parts, the upper mold part having a plurality of ducts extending upwardly from said passage to the cavity base, a plurality of valve elements, one in each of said ducts, each of said valve elements comprising a head portion engageable with the cavity base to prevent the ingress of moldable material to its associated duct, each valve element having a stem portion extending through the duct including an abutment in the fluid passage for limiting opening movement of the valve, conduit means for communicating fluid pressure to the fluid passage and resultantly to the valve elements to direct fluid laterally along the cavity and the valve elements being disposed in a zone concentric with the cavity.

5. A permanent mold for plastic or liquid solidifying material comprising a body of rigid material, the body comprising an upper part having an upwardly open mold cavity therein, a lower part detachably secured to the upper part having a continuous fluid duct formed in the top surface thereof, a plurality of upwardly extending channels in substantially equally spaced relation disposed generally concentrically of the mold cavity effecting communication between the fluid duct and mold cavity, a valve element movably mounted in each of said channels including an enlarged head engageable with portions of the cavity by gravity to close its associated channel against the ingress of moldable material, each valve element including a stem projected through the channel having a lateral abutment at its lower end to limit valve opening movement through contact with the mold body, and means for transmitting fluid under pressure through the duct channels to provide balanced lifting pressure between the moldable material and the cavity.

LEO F. NOCK.